United States Patent
Fascenda et al.

(10) Patent No.: US 9,338,005 B2
(45) Date of Patent: May 10, 2016

(54) SYSTEM FOR AND METHOD OF REMOTE SECURE BACKUP

(75) Inventors: Anthony Fascenda, Rockville, MD (US); Emil Sturniolo, Medina, OH (US); Robert Cichielo, Asbury, NJ (US); Paul Benware, Mendon, NY (US)

(73) Assignee: KOOLSPAN, INC., Bethesda, MD (US)

( * ) Notice: Subject to any disclaimer, the term of this patent is extended or adjusted under 35 U.S.C. 154(b) by 803 days.

(21) Appl. No.: 12/533,778

(22) Filed: Jul. 31, 2009

(65) Prior Publication Data

US 2010/0031063 A1  Feb. 4, 2010

Related U.S. Application Data

(60) Provisional application No. 61/085,277, filed on Jul. 31, 2008.

(51) Int. Cl.
| | | |
|---|---|---|
| *G06F 11/30* | (2006.01) | |
| *G06F 12/14* | (2006.01) | |
| *H04L 9/00* | (2006.01) | |
| *H04L 9/08* | (2006.01) | |
| *G06F 11/14* | (2006.01) | |

(52) U.S. Cl.
CPC .......... *H04L 9/0891* (2013.01); *G06F 11/1458* (2013.01); *H04L 9/0894* (2013.01); *G06F 11/1469* (2013.01); *H04L 2209/80* (2013.01)

(58) Field of Classification Search
CPC . G06F 21/70; G06F 11/1458; G06F 11/1469; H04L 9/00; H04L 9/08; H04L 9/0894; H04L 9/0891

USPC .......... 713/193, 171; 380/277, 278, 281, 44; 711/103, 162, E12.092, 111
See application file for complete search history.

(56) References Cited

U.S. PATENT DOCUMENTS

| | | | |
|---|---|---|---|
| 5,892,900 A | 4/1999 | Ginter et al. | |
| 7,240,219 B2 * | 7/2007 | Teicher et al. | 713/193 |
| 7,502,628 B2 * | 3/2009 | Imaeda | 455/558 |
| 7,539,863 B2 * | 5/2009 | Phillips et al. | 713/168 |
| 7,596,703 B2 * | 9/2009 | Kohiyama et al. | 713/193 |
| 8,055,911 B2 * | 11/2011 | Feng et al. | 713/193 |
| 2002/0013897 A1 * | 1/2002 | McTernan et al. | 713/153 |
| 2002/0080967 A1 * | 6/2002 | Abdo et al. | 380/270 |
| 2003/0204743 A1 * | 10/2003 | Devadas et al. | 713/200 |
| 2004/0180694 A1 * | 9/2004 | Lai et al. | 455/558 |
| 2006/0288232 A1 * | 12/2006 | Ho et al. | 713/185 |
| 2007/0214382 A1 * | 9/2007 | Sato | 714/6 |
| 2008/0016307 A1 * | 1/2008 | Takano et al. | 711/164 |
| 2008/0027868 A1 | 1/2008 | Ljung et al. | |
| 2008/0076355 A1 | 3/2008 | Waltermann et al. | |
| 2008/0192940 A1 | 8/2008 | Feng et al. | |

FOREIGN PATENT DOCUMENTS

WO  WO 2006/097022  9/2009

OTHER PUBLICATIONS

Notification of Transmittal of the International Search Report and the Written Opinion of the International Searching Authority, or the Declaration, dated Sep. 15, 2009.
GCC Search Report dated Apr. 4, 2014 for Application No. 2009/14024.

* cited by examiner

*Primary Examiner* — Saleh Najjar
*Assistant Examiner* — Feliciano Mejia
(74) *Attorney, Agent, or Firm* — Hunton & Williams LLP

(57) ABSTRACT

Systems and methods for registering a module for backup, backing up a module, and restoring a backed up module are provided.

16 Claims, 13 Drawing Sheets

400

Import/Export Key Table 400

| Client TrustChip ID | Import Key | Export Key |
|---|---|---|
| 109851 | 7a459bf103 | 92fb8c11038 |

Backup Key Export Table 410

| TrustChip ID | Memory Export Key | | |
|---|---|---|---|
| 109581 | 75e54bf1143 | | |

SYSTEM FOR AND METHOD OF REMOTE SECURE BACKUP

CROSS-REFERENCE TO RELATED APPLICATIONS

The present application is related to and claims priority to U.S. Patent Application No. 61/085,277 filed Jul. 31, 2008 entitled "System and Method of Remote Secure Backup" to Fascenda et al., the disclosure of which is hereby incorporated by reference in its entirety.

The present application is related to U.S. patent application Ser. No. 12/109,883, entitled "System For And Method Of Cryptographic Provisioning" to Fascenda et al., which is related to U.S. Pat. No. 7,325,133 entitled "Mass Subscriber Management" to Fascenda, U.S. Pat. No. 7,325,134 entitled "Localized Network Authentication And Security Using Tamper-Resistant Keys" to Fascenda, U.S. Utility patent application Ser. No. 11/951,202 entitled "Secure Mobile Telephony" to Fascenda et al., and U.S. Provisional Application No. 60/987,709 entitled "Secure Mobile Telephony" to Fascenda et al., the disclosures of which are hereby incorporated by reference in their entireties.

FIELD OF THE INVENTION

The present invention generally relates to a technique for securely backing up a data store and/or file system.

BACKGROUND OF THE INVENTION

Memory devices such as USB Memory sticks and SD cards are often misplaced, lost or stolen. In such a circumstance, the lost memory device may contain hundreds of megabytes (more or less) of corporate or personal data. Techniques as disclosed in U.S. patent application Ser. No. 12/109,883, entitled "System For And Method Of Cryptographic Provisioning" to Fascenda et al. may be used to secure data in a memory device. However, protecting the data from inappropriate access is only part of the problem. A memory device may be lost, damaged, destroyed, stolen or otherwise be rendered unavailable or nonfunctional. In such instances, techniques according to certain embodiments of the present invention may be used to restore the data of a unavailable or nonfunctional memory device on a new, replacement memory device. Such memory devices may be modules as disclosed in U.S. patent application Ser. No. 12/109,883, entitled "System For And Method Of Cryptographic Provisioning" to Fascenda et al.

SUMMARY OF CERTAIN EMBODIMENTS OF THE INVENTION

According to an embodiment of the present invention, a method of securely registering a module for backup, wherein the module comprises at least one nonvolatile memory and a processor is disclosed. The method includes provisioning a module, generating a backup key for the module, encrypting the backup key using an export key, transmitting the encrypted backup key and other information to a backup center, and storing the encrypted backup key and the other information with the backup center.

Various optional features of the embodiment described in the above paragraph include the following. The backup key may be unique to the module. The module may comprise a first nonvolatile memory and a second nonvolatile memory, which may be logically partitioned portions of a single physical persistent memory. The method may include that the module lacks a power supply. A form factor of the module may be one or more of: a Secure Digital Card ("SD"), mini SD, micro SD, PCMCIA, P2, Compact Flash, Memory Stick, PRO Memory Stick, PRO Duo Memory Stick, Micro Memory Stick, Multi Media Card, SmartMedia Memory Card, MultiMedia Memory Card, Reduced Size MultiMedia Memory Card, MultiMedia Memory Card Mobile, MultiMedia Memory Card Plus, MultiMedia Memory Card Micro, xD Memory Card, SIP, DIP and Universal Serial Bus ("USB").

According to an embodiment of the present invention, a method of securely backing up a module with cryptographic parameters, wherein the module comprises at least one nonvolatile memory and a processor, is disclosed. The method includes determining whether user blocks or sectors of data have changed on a module, encrypting the changed blocks or sectors of data using a backup key, transmitting the encrypted changed blocks or sectors of data to a backup center, and storing the changed memory blocks or sectors in storage associated with the backup center.

Various optional features of the embodiment described in the above paragraph include the following. The backup key may be static. The backup key may be generated and transmitted to the backup center with the encrypted changed blocks or sectors of data. The module may comprise a first nonvolatile memory and a second nonvolatile memory, which may be logically partitioned portions of a single physical persistent memory. The method may include that the module lacks a power supply. A form factor of the module may be one or more of: a Secure Digital Card ("SD"), mini SD, micro SD, PCMCIA, P2, Compact Flash, Memory Stick, PRO Memory Stick, PRO Duo Memory Stick, Micro Memory Stick, Multi Media Card, SmartMedia Memory Card, MultiMedia Memory Card, Reduced Size MultiMedia Memory Card, MultiMedia Memory Card Mobile, MultiMedia Memory Card Plus, MultiMedia Memory Card Micro, xD Memory Card, SIP, DIP and Universal Serial Bus ("USB").

According to an embodiment of the present invention, a method of securely restoring a new module with cryptographic parameters, wherein the new module comprises at least one nonvolatile memory and a processor, is disclosed. The method includes registering a new module, reading an original backup key into a master module, the original backup key associated with an old module, decrypting the original backup key, reading a new backup key into the master module, the new backup key associated with the new module, reading original user data from backup storage, decrypting the original user data using the original backup key, encrypting the decrypted original user data using the new backup key, and transmitting the user data encrypted using the new backup key to the new module and the backup storage.

Various optional features of the embodiment described in the above paragraph include the following. The method may include destroying the original user data and the original backup key. The method steps of decrypting the original backup key, decrypting the original user data, and encrypting the decrypted original user data may occur within the master module. The module may comprise a first nonvolatile memory and a second nonvolatile memory, wherein the first nonvolatile memory and the second nonvolatile memory are logically partitioned portions of a single physical persistent memory. The method may include that the module lacks a power supply. A form factor of the module may be one or more of: a Secure Digital Card ("SD"), mini SD, micro SD, PCMCIA, P2, Compact Flash, Memory Stick, PRO Memory Stick, PRO Duo Memory Stick, Micro Memory Stick, Multi Media Card, SmartMedia Memory Card, MultiMedia Memory Card, Reduced Size MultiMedia Memory Card, MultiMedia Memory Card Mobile, MultiMedia Memory Card Plus, MultiMedia Memory Card Micro, xD Memory Card, SIP, DIP and Universal Serial Bus ("USB").

According to an embodiment of the present invention, a system for securely registering a module for backup is disclosed. The system includes a master module comprising at least a cryptographic key, where the master module is operable to encrypt data according to the cryptographic key, a backup center, in communication with the master module and a module, where the backup center comprises off-site storage and a backup key database, and where the backup center may be operable to store encrypted data from the module and recall data to the module or to a second module.

According to an embodiment of the present invention, a system for securely backing up a module with cryptographic parameters is disclosed. The system includes a module, the module may comprise at least one nonvolatile memory and a processor, the module may be in communication with a backup center, wherein the module may be operable to encrypt data changed after a historical time, and transmit the encrypted changed data to the backup center.

Various optional features of the embodiment described in the above paragraph include the following. The historical time may be the time the module last transmitted encrypted changed data to the backup center.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which:

FIG. 4a depicts an exemplary data storage table according to an embodiment of the present invention;

FIG. 4b depicts an exemplary data storage table according to an embodiment of the present invention;

DETAILED DESCRIPTION OF EMBODIMENTS

Figure 1:
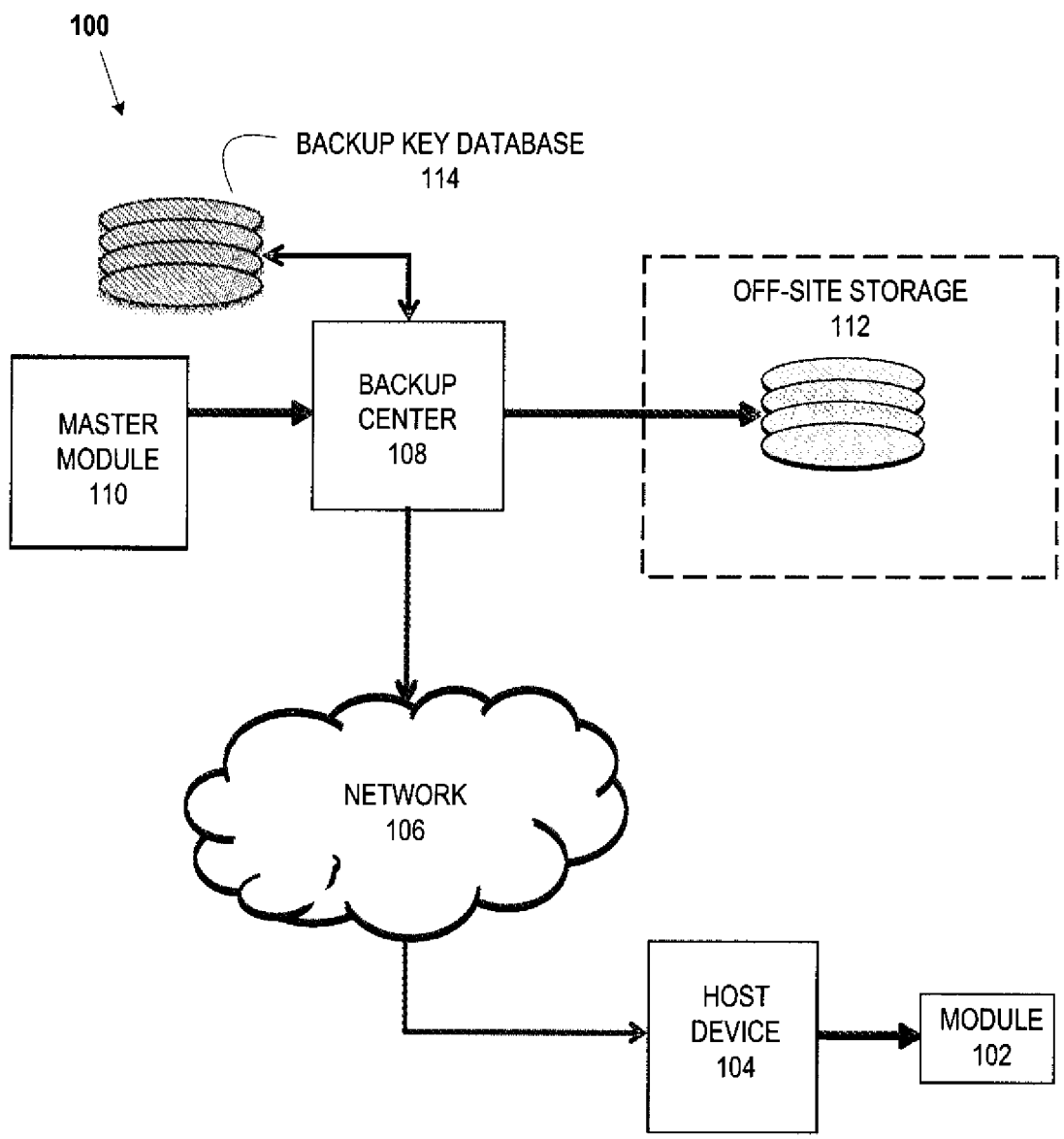
FIG. 1 depicts an exemplary system according to an embodiment of the present invention.

A description of certain embodiments of the present invention may be understood by referring to FIGS. 1 through 6, wherein like reference numerals refer to like elements, and are generally described in the context of a remote access network.

According to some embodiments of the present invention, systems and methods are provided for securely registering for backup, backing up, and restoring a module with cryptographic parameters. In these and various other embodiments, the module with cryptographic parameters may be the same as or similar to the module as disclosed in U.S. patent application Ser. No. 12/109,883, entitled "System For And Method Of Cryptographic Provisioning" to Fascenda et al.

FIG. 1 depicts an exemplary system 100 for securely registering, backing up and restoring a module with cryptographic parameters. System 100 may include a module 102, host device 104, network 106, backup center 108, master module 110, off-site storage 112, and a backup key database 114.

In various exemplary embodiments, module 102 may be the same as or similar to the exemplary modules as disclosed in U.S. patent application Ser. No. 12/109,883, entitled "System For And Method Of Cryptographic Provisioning" to Fascenda et al. A form factor for the module may be one or more of: Secure Digital ("SD"), mini SD, micro SD, PCMCIA, P2, Compact Flash, Memory Stick, PRO Memory Stick, PRO Duo Memory Stick, Micro Memory Stick, Multi Media Card, SmartMedia Memory Card, MultiMedia Memory Card, Reduced Size MultiMedia Memory Card, MultiMedia Memory Card Mobile, MultiMedia Memory Card Plus, MultiMedia Memory Card Micro, xD Memory Card, Single In-line Package ("SIP"), Dual In-line Package ("DIP") and Universal Serial Bus ("USB").

As shown in FIG. 1, module 102 may be coupled to host device 104. In various exemplary embodiments, host device 104 may include, without limitation, a mobile device, a mobile cellular telephone, a wireless device, a video camera, a USD device, a USB storage device, a personal digital assistant and/or any other like device. For example, where host device 104 is a mobile cellular telephone, module 102 may be plugged into a micro-SD or SD slot (not shown) of the mobile cellular telephone. The module may be as described in U.S. Utility patent application Ser. No. 11/951,202 entitled "Secure Mobile Telephony" to Fascenda et al., where the module is coupled to a mobile telephone.

In mobile phone embodiments, the backup process described herein may be used to securely store in a remote location the contents of each phone conversation. This may be accomplished by storing digital copies of each conversation in memory (e.g., user memory) of a module as each call occurs. The backup process as described herein may then be used to remotely store such copies in a secure manner.

Other embodiment may include that the module is coupled to a digital camera, such as a digital video camera. In such embodiments, the videoed content may be stored on a module, and the backup process as described herein may then be used to remotely store such content in a secure manner.

Figure 2:
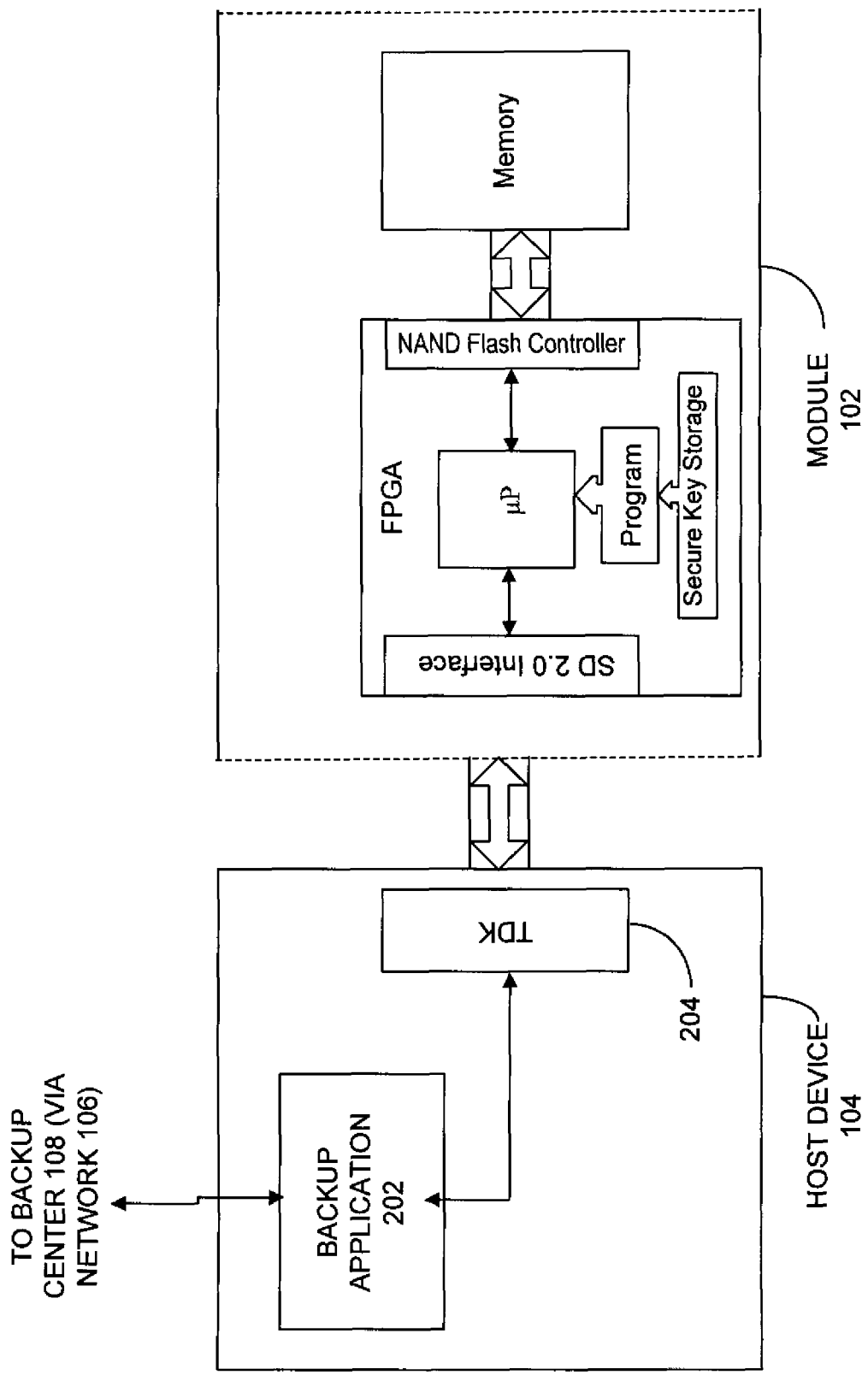
FIG. 2 depicts an exemplary coupling of a host device and module according to an embodiment of the present invention.

FIG. 2 depicts a detailed view of an exemplary module 102 coupled to host device 104. Exemplary details of the components of module 102, including the FPGA and memory, can be found in the description relating to the module as described in U.S. patent application Ser. No. 12/109,883, entitled "System For And Method Of Cryptographic Provisioning" to Fascenda et al. As shown in FIG. 2, host device 104 may include a backup application 202 and an interface 204. Backup application 202 may include one or more applications that execute instructions to monitor the state of the memory inside module 102. In various exemplary embodiments, at least a portion of the memory of module 102 may be encrypted using a personalization key as described in U.S. patent application Ser. No. 12/109,883, entitled "System For And Method Of Cryptographic Provisioning" to Fascenda et al. For example, backup application 202 may detect changed blocks of memory by observing changed bits to determine whether blocks of memory have changed. Although shown as a component of host device 104, in various exemplary embodiments, backup application 202 may be a component of module 102, backup center 108, and/or any of the components associated with backup center 108. In some embodiments, the backup application may execute in any, or a combination, of module 102, host device 104 and backup center 108.

Referring back to FIG. 1, network 106 may include an analog telephone network, a digital telephone network, a cellular telephone network, a public wide area network ("WAN"), such as the Internet, or, different connections, such as combinations of public and private WANs, local areas networks ("LANs"), wireless LANs, encrypted networks, body area networks, or other wired or wireless networks. In exemplary embodiments of the disclosure, network 106 may include one, or any number of the exemplary types of networks mentioned above operating as a stand-alone network or in cooperation with each other. Use of the term network herein is not intended to limit the network to a single network.

As shown in FIG. 1, backup center 108 may be associated with master module 110, off-site storage 112, and backup key database 114. Backup center 108 may communicate with host device 104 via network 106 to securely and remotely register, backup, and restore user data that may be associated with module 102 as will be described in greater detail below.

In various exemplary embodiments, master module 110 may be the same as or similar to the master module as disclosed in U.S. patent application Ser. No. 12/109,883, entitled "System For And Method Of Cryptographic Provisioning" to Fascenda et al.

Off-site storage 112 may store user data associated with module 102. Although referred to herein as off-site storage and shown as being separate from backup center 108, off-site storage 112 may be in the same physical location as backup center 108. In addition, or in the alternative, off-site storage may be included within backup center 108. Similarly, master module 110 and backup key database 114 may be in the same physical location as backup center 108 and/or may be included within backup center 108.

In various exemplary embodiments, backup key database 114 may contain mappings between module 102 and cryptographic keys associated with module 102 as will be described in greater detail below. In some embodiments, the backup key database 114 may contain a mapping of the module and the data associated with the module, and the cryptographic keys associated with module 102 may be stored, for example, with the data associated with the module 102. In some embodiments, the cryptographic keys associated with module 102 may be stored with the data associated with the module 102, and the data may also include an identifier that relates to the module the data is associated with. If the cryptographic keys and the mappings between module 102 and cryptographic keys associated with module 102 are stored with the data associated with module 102, then, in some embodiments, the backup key database 114 may not be implemented.

Figure 3:
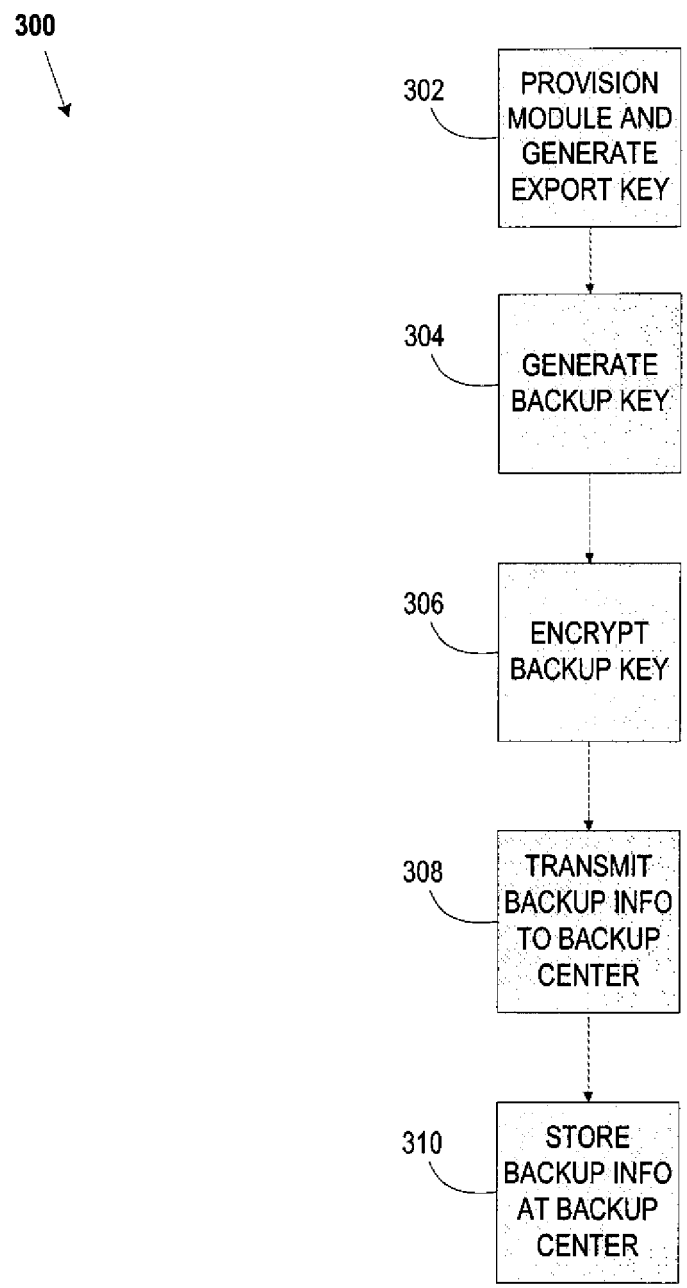
FIG. 3 depicts a flowchart illustrating an exemplary method for registering a module for a backup process according to an embodiment of the present invention.

FIG. 3 depicts a flow chart 300 which illustrates an exemplary method for registering a module for a backup process. In various exemplary embodiments, a module may be registered prior to providing the module to an end-user and/or a module may be registered remotely using, e.g., public key encryption after being provided to the end-user.

In block 302, a module may be provisioned and an export key may be generated. In various exemplary embodiments, a module may be provisioned in the same or a similar manner as described in U.S. patent application Ser. No. 12/109,883, entitled "System For And Method Of Cryptographic Provisioning" to Fascenda et al. Also, the export key that may be generated may be the same as or similar to the export key described in U.S. patent application Ser. No. 12/109,883, entitled "System For And Method Of Cryptographic Provisioning" to Fascenda et al. In various embodiments, a master module may use a cryptographic key to encrypt the export key and any ciphertext that may be maintained in a backup key database.

In block 304, a program associated with the module may automatically generate a backup key. Alternately, the backup key may in some embodiments be an export key as disclosed in U.S. patent application Ser. No. 12/109,883, entitled "System For And Method Of Cryptographic Provisioning" to Fascenda et al. The backup key may be encrypted using any of the encryption keys that have been provided to a backup center during the registration process disclosed in U.S. patent application Ser. No. 12/109,883, entitled "System For And Method Of Cryptographic Provisioning" to Fascenda et al. The backup key may be used to encrypt all user data to be sent to the backup center for backup.

In block 306, the export key may be used to encrypt the backup key. In some embodiments, a key from a key table may be used as an export key to encrypt the backup key. For example, a key table as described in U.S. Pat. No. 7,325,133, entitled "Mass Subscriber Management" to Fascenda, may be used to encrypt the backup key. A key from a key table may allow for a different export key to be used for different modules. A key from a key table may also allow for a different export key to be used with data from the same module. For example, a backup key may be created and encrypted with a key from the key table. The encrypted backup key and the index of the key from the key table used to encrypt the backup key may be stored with the data from the module encrypted using the backup key, or may be stored in the backup key database. A module may use more than one backup key to encrypt and transmit data, and may use more than one backup key during a backup operation or may use a different backup key for one or more different backup operations.

In block 308, the ciphertext of the encrypted backup key, a module identifier, and a hash of the backup key may be provided to a backup center.

In block 310, the ciphertext, module identifier and hash of the backup key may be stored in a backup key database. In various exemplary embodiments, the backup key and other information, including the module identifier may be left encrypted when stored in the backup key database. As noted above, a master module may use a cryptographic key to encrypt the backup key and any ciphertext that may be maintained in a backup key database.

FIGS. 4a and 4b depict exemplary tables 400 and 410, respectively, that may be maintained in a backup key database. As shown in FIG. 4a, table 400 may include maintain one or more module identifiers 402, one or more import keys 404 associated with the module identified by the respective module identifier, and one or more export 406 keys associated with the module identified by the respective module identifier. As shown in FIG. 4b, table 410 may maintain one or more identifiers 412 and one or more backup keys 414 associated with the module identified by the respective module identifier. Although shown as being maintained in separate tables, it is to be understood that the import, export, and backup keys may be in a single database or table or three separate databases or tables. Also, the information stored in tables 400 and 410 may be encrypted by a cryptographic key that is available within the master module.

Figure 5:
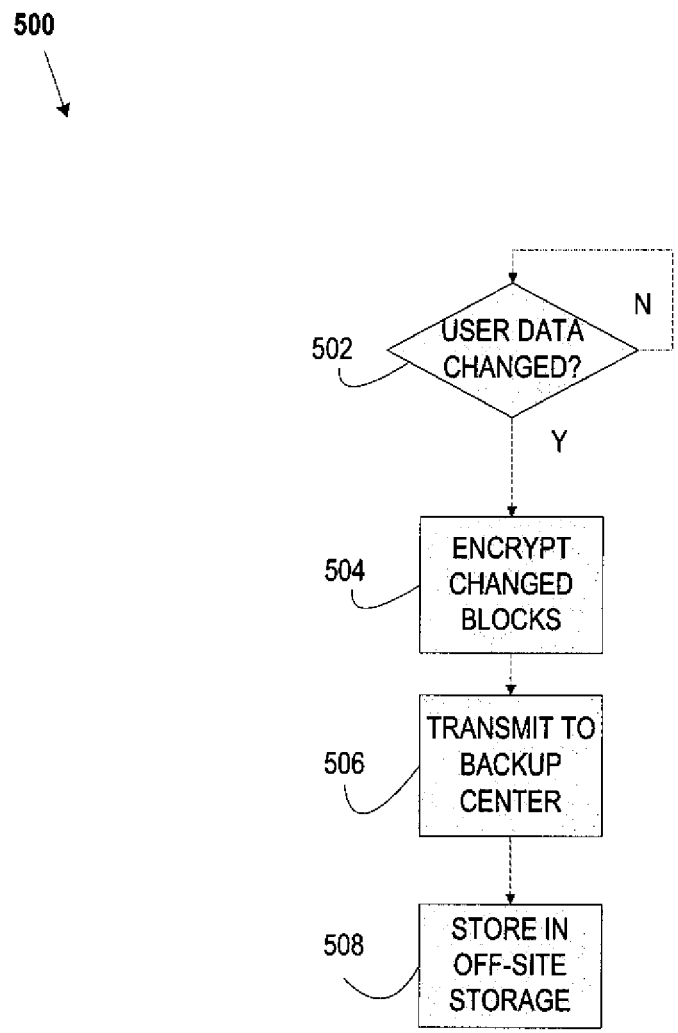
FIG. 5 depicts a flowchart illustrating an exemplary method for backing up a module according to an embodiment of the present invention.

FIG. 5 depicts a flow chart 500 which illustrates an exemplary method for backing up a module. In various exemplary embodiments, the method for backing up a module may execute periodically on a host device. Also, or in the alternative, the backup center may notify the host device that a backup is needed and the host device may then initiate a backup. In the case of a mobile telephone coupled to a module, the mobile telephone may receive, e.g., a system-level short message (SMS) instructing it to initialize communications with the backup system. According to embodiments of the invention, the purpose of the backup process may be to maintain a mirror image of the module data for restoration to a new module if needed.

In block 502, it may be determined whether user data and/or memory stored on a module has changed. In an exemplary embodiment, to make this determination, a backup application may detect changed data at the point of writing memory blocks of user data on the module.

In block 504, the changed memory blocks may be encrypted. In an exemplary embodiment, the backup application, for example, may collect the changed sections based on the dirty bits set, for example, by the filesystem or operating system associated with the module, decrypt those sections using a personalization key, re-encrypt those sections using, for example, the backup key. In an exemplary embodiment, the backup key may be static. In another exemplary embodiment, the backup key may be generated for, for example, each changed memory block or for the set of changed memory blocks.

In block 506, the encrypted sections may be transmitted to the backup center. If, as shown in block 504, the backup key is generated for the changed data block or data blocks, the backup key or backup keys may also be transmitted to the backup center. In block 508, the backup center may store the encrypted sections in off-site storage.

Figure 6:
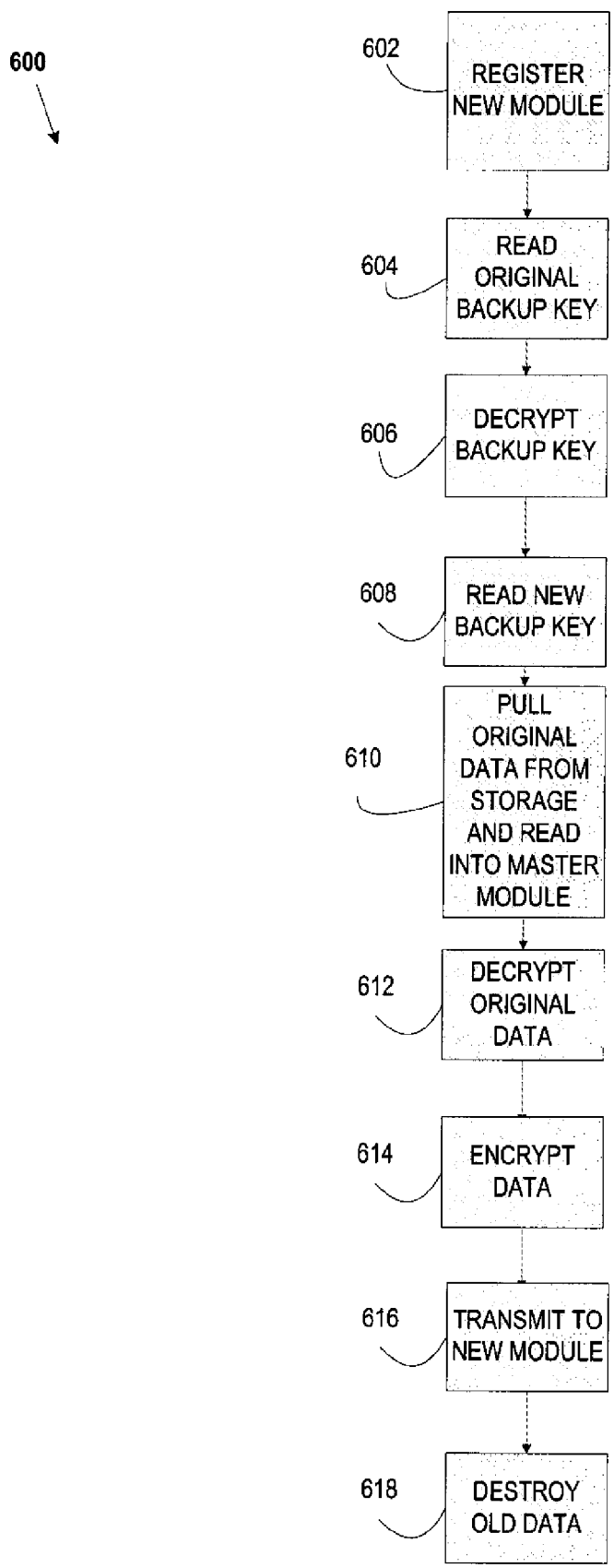
FIG. 6 depicts a flowchart illustrating an exemplary method for restoring a backed up module according to an embodiment of the present invention.

FIG. 6 depicts a flow chart 600 which illustrates an exemplary method for restoring backed up module data to a new module. This process may occur when a module is unavailable or inoperative.

In block 602, a new module may be registered for restoration. In various exemplary embodiments, the new module may be registered as described above with respect to blocks 302 and 304. For example, to register a new module, the new serial number of the module and the module import and export keys may be securely imported into an import/export key table as shown in, for example, FIG. 4a. A new backup key may also be securely imported into a backup key table as shown in, for example, FIG. 4b.

In block 604, the original backup key associated with the original (lost or stolen) module may be read from the backup key database into the master module. In an embodiment, the original backup key may be associated with the user data from the original module, and the original backup key may be read when the user data from the original module is read in block 610.

In block 606, the master module may decrypt the original backup key. In an exemplary embodiment, the master module may decrypt the original backup key using, for example, an import key. Once decrypted in block 606, the original backup key may be available.

In block 608, the backup key for the new module may be read from the backup key database into the master module.

In block 610, user data from the original module is pulled from storage and read into the master module, e.g., on a record-by-record basis.

In block 612, for each record, the encrypted module data is decrypted using the original backup key. This decrypting may temporarily result in plaintext data residing within the master module.

In block 614, for each record, the plaintext data is encrypted using the new backup key.

In block 616, the encrypted ciphertext is transmitted to the new module. This may be performed record-by-record. In some embodiments, the data may substantially simultaneously be sent to off-site storage. Writing the newly encrypted data to the off-site storage in this manner may ensure that a backup of the new module is created simultaneously with the provisioning of the new module. In other embodiments, the backup of the new module is performed as disclosed elsewhere herein.

In block 618, once all of the data has been encrypted and transferred to the new module, the original encrypted memory data and/or any plaintext data associated with the original module may be destroyed from the master module and/or the off-site storage.

According to some embodiments of the present invention, a system for and method of provisioning a cryptographic module are presented. An exemplary module is discussed in detail in reference to FIG. 7. Some embodiments of the module take the form of a smart card, such as a micro Secure Digital card, but include functionality in addition to nonvolatile (i.e., persistent) memory. Modules according to certain embodiments of the present invention are configured to be operably coupled to, for example, computers or mobile phones. When coupled to a mobile phone, some embodiments of the present invention work together with associated software to allow such a phone to place and receive end-to-end encrypted voice calls. This functionality is disclosed in detail in U.S. Utility patent application Ser. No. 11/951,202 entitled "Secure Mobile Telephony" to Fascenda et al., the disclosure of which is incorporated by reference. Thus, modules according to certain embodiments of the present invention assist in providing encrypted communications and accordingly store cryptographic parameters, such as cryptographic keys.

Certain embodiments of the present invention include techniques for securely provisioning modules with cryptographic parameters, such as cryptographic keys. More particularly, certain embodiments of the present invention provide techniques for provisioning modules in a manner that avoids or minimizes the possibility of malevolent individuals involved in the manufacturing or programming processes compromising the modules' security. Some embodiments accomplish this goal by provisioning the modules after they have been manufactured in a way that detects, destroys, replaces or ignores problematic data that previously existed in the module. Thus, for example, modules according to certain embodiments of the present invention may be manufactured in a relatively insecure facility and then transferred to a secure facility for provisioning with cryptographic parameters without compromising the security of the cryptographic parameters.

Some embodiments of the present invention allow for securely provisioning by assigning different tasks to different entities. The following six paragraphs present an overview of an exemplary provisioning process for some exemplary embodiments, but should not be taken as limiting. Initially, a manufacturer creates one or more integrated circuits in a semiconductor fabrication facility. Such integrated circuit(s) contain basic infrastructure upon which programming is later installed. Note that at this stage, the integrated circuit(s) are essentially just fabricated semiconductor slabs lacking connectors. A second manufacturer, which may be the same entity as the first manufacturer, then mills the integrated circuit(s) to reduce their thicknesses and assembles them into a secure module having the desired form factor, such as a Secure Digital card, discussed below in reference to FIG. 7.

Next, an entity referred to as the "test programming programmer," which may be the same as the first or second manufacturer, a base provisioning entity, or another entity, programs the module with encrypted test programming and associated cryptographic keys supplied by the base provisioning entity, such that the module can only be reprogrammed by an entity that knows at least one of the cryptographic keys. This process is discussed in detail below in reference to FIG. 8. More particularly, the base provisioning entity encrypts the test programming using a cryptographic key, referred to as the "test programming key." The encryption operation, which is performed using equipment external to the module, generates an encryption authentication tag (i.e., a signature) for the programming. The base provisioning entity rolls the encrypted test programming into a installation file that includes the encryption authentication tag in its header. The base provisioning entity supplies the test programming programmer with the test programming installation file together with the test programming key and a lock key. When installed, the lock key locks the module from being programmed unless the lock key is supplied. The test programming programmer installs the test programming key and the lock key into the module.

The test programming programmer then proceeds to install the test programming file into the module, supplying the lock key in order to do so. When the module is programmed with the encrypted test programming, the module internally decrypts the associated file using the installed test programming key. This internal decryption generates a decryption authentication tag, which the module internally compares with the encryption authentication tag contained in the file header. If the tags do not match, then the test programming programmer knows that one or both of the test programming key and the test programming have been altered or corrupted, the process is stopped, and the module is set aside. Otherwise, the test programming programmer tests the module by executing the test programming, which verifies that the module is free from manufacturing flaws and tampering. The test programming programmer may then erase the test programming and the test programming key and may reset or erase the lock key. Alternately, the test programming programmer may leave one or both of (1) the test programming and test programming key, or (2) the lock key installed in the module.

Modules that pass the test may be retained by the same entity, or transferred to either the base provisioning entity or another provisioning entity. The entity in possession of the module at this stage is referred to as the "key generation programming programmer." The key generation programming programmer installs additional provisioning material supplied by the base provisioning entity. This process is described below in reference to FIG. 8. If the test programming is still present in the module, the key generation programming programmer may re-run the test programming and again test the module. Once the test, if any, is successfully completed, the key generation programming programmer proceeds with its installation tasks. In particular, the key generation programming programmer has access to encrypted key generation programming and the cryptographic key used to encrypt it, both of which may be supplied by the base provisioning entity. The encrypted key generation programming includes a header, which contain an encryption authentication tag for the encrypted key generation programming. The key generation programming programmer also has access to the currently-installed lock key, if any. If no lock key is currently installed, the key generation programming and general operation programming programmer may install a random lock key. The key generation programming programmer then installs the key generation programming encryption key and the key generation programming, supplying any necessary lock key in the process. During installation, the module internally decrypts the key generation programming using the installed key generation programming encryption key. The decryption generates a decryption authentication tag, which is compared with the associated encryption authentication tag in the encrypted key generation programming header. If the comparison fails, then one or both of the key generation programming and key generation programming encryption key are assumed to have been tampered with or corrupted, and the module is set aside. Otherwise, modules that pass the test are passed to the next stage in the provisioning process. At this stage, the key generation programming programmer may transfer the module to a different provisioning entity, such as the base provisioning entity, or retain the module in order to conduct the next step in the process. If transferred, the key generating programming entity provides to the transferee the lock key, but not the key that encrypts the key generation programming.

Figure 8:
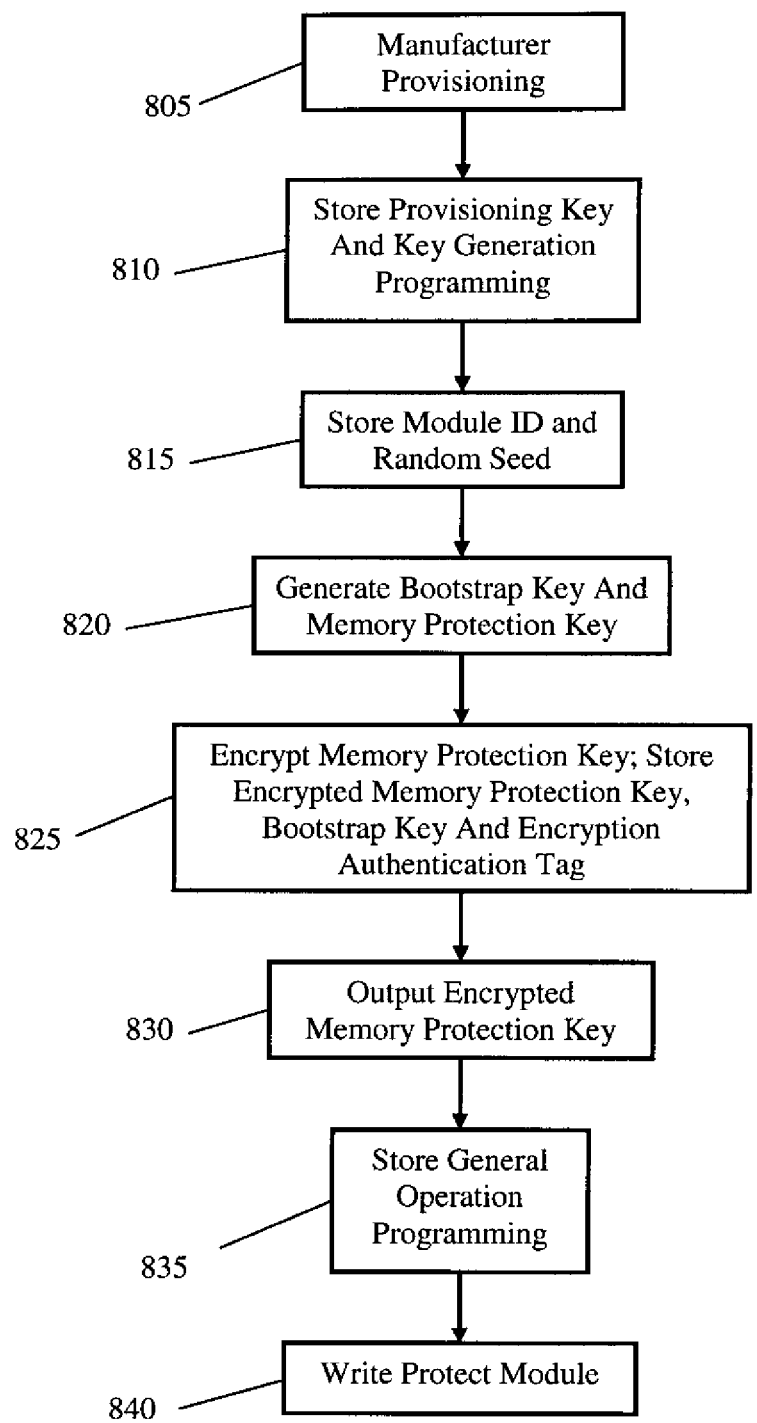
FIG. 8 is a flowchart depicting initial module provisioning according to an embodiment of the present invention.

At the next stage, the entity in possession of the module executes the key generation programming, which generates certain cryptographic parameters internally within the module as described in detail in reference to FIG. 8. The key generation programming stores these parameters within the module as detailed herein. Note that no entity, not including the base provisioning entity, the key generation programming programmer, nor the general operation programming programmer, has access to certain internally-generated and stored cryptographic parameters such as the memory protection key, which is described in detail below. Instead, certain cryptographic parameters are generated and encrypted entirely within the module and never leave the module in unencrypted form. At this stage, the module may be passed to another provisioning entity or retained by the entity that executes the key generation programming. If transferred, the receiving entity also receives the lock key.

Next, the entity in possession of the module replaces the key generation programming with encrypted general operation programming, which is supplied by the base provisioning entity. To do so, the entity in possession of the module, referred to as the "general operation programming programmer" first installs the cryptographic key that is used to encrypt the general operation programming. The general operation programming programmer also inputs a lock key in order to install the general operation programming. As with the key generation programming, the installation process validates the general operation programming by comparing an internally generated authentication tag with an authentication tag in the header of the general operation programming installation file. If the comparison fails, the module is set aside. Otherwise, the general operation programming is made permanent, and external access to certain internally-stored parameters in unencrypted form is forever prevented, as detailed herein. The lock key is thereafter useless, as the general operation programming cannot be altered. In some embodiments, the general operation programming programmer sets the lock key to a random value, which is not recorded by the general operation programming programmer or any other entity. The module is then passed to another entity, or retained by the general operation programming programmer, in order to execute the general operating fabric and complete the basic provisioning process.

The entity now in possession of the module executes the general operation programming to provision the module with additional cryptographic parameters. This provisioning process, in general, makes use of the cryptographic parameters generated by the key generation programming as discussed below in detail in reference to FIGS. 9-13.

Figure 7:
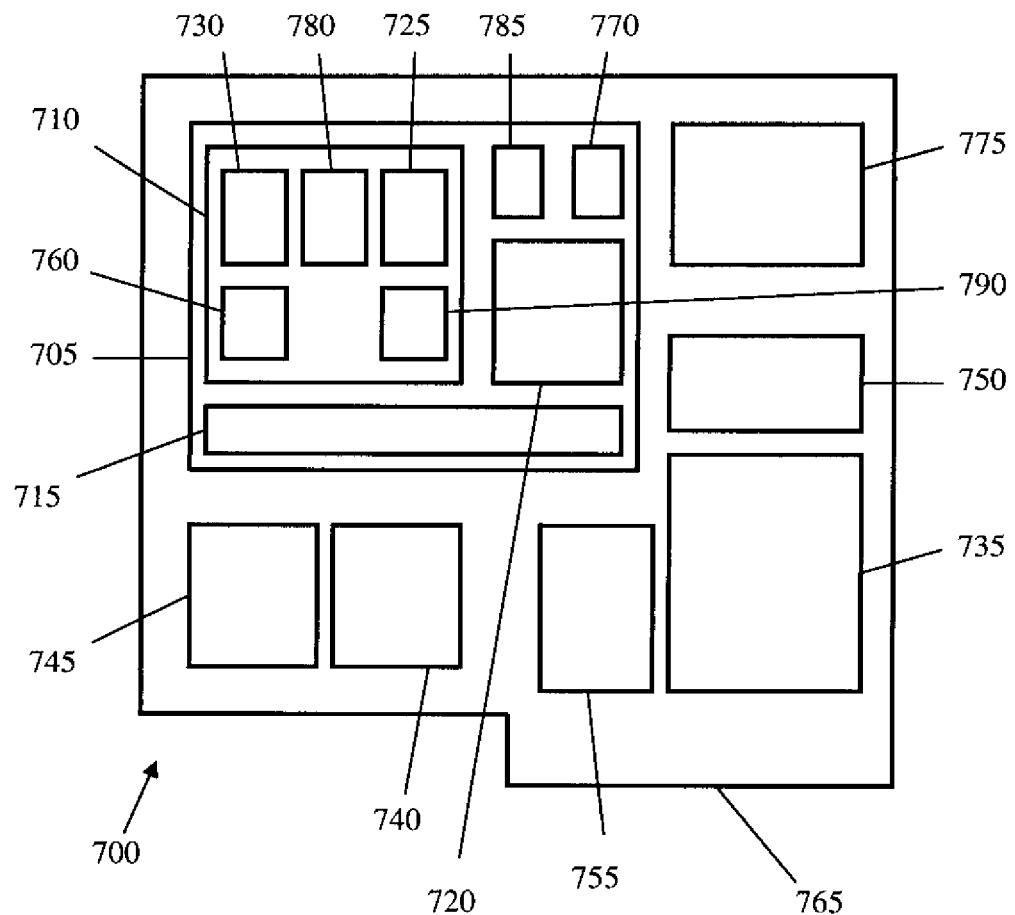
FIG. 7 is a schematic diagram of a module according to an embodiment of the present invention.

FIG. 7 is a schematic diagram of a module according to an embodiment of the present invention. Module 700 is depicted in FIG. 7 as being provisioned with various features as explained below in reference to FIGS. 8-12. Module 700 may take the form factor of a standard memory card. Exemplary form factors include, by way of non-limiting example, Secure Digital ("SD"), mini SD, micro SD, PCMCIA, P2, Compact Flash, Memory Stick, PRO Memory Stick, PRO Duo Memory Stick, Micro Memory Stick, SmartMedia Memory Card, MultiMedia Memory Card, Reduced Size MultiMedia Memory Card, MultiMedia Memory Card Mobile, MultiMedia Memory Card Plus, MultiMedia Memory Card Micro, xD Memory Card, USB, single in-line package ("SIP") and dual in-line package ("DIP"). Other form factors are also possible.

Module 700 includes an integrated circuit 705 that itself may include a Field Programmable Gate Array ("FPGA") 710, a Flash Read Only Memory ("FROM") 715 (a type of nonvolatile memory), a Random access Memory ("RAM") 720, a processor 725, a cryptographic co-processor 730 and a Joint Test Action Group ("JTAG") debug module 780. An exemplary integrated circuit that includes many features of integrated circuit 705 is a ProASIC3L series A3P1000, available from ACTEL of Mountain View, Calif., U.S.A. This integrated circuit may be implemented as integrated circuit 705 in certain embodiments of the present invention.

One or more of features 725, 730 and 780 may be programmed into FPGA 710 or elsewhere. By way of non-limiting example, one or more of processor 725, cryptographic co-processor 730 and JTAG debug module 780 may be dedicated circuitry that is fabricated on the same semiconductor block as FPGA 710, on a different semiconductor block or blocks, or may be implemented in FPGA 710 itself by programming FPGA 710 with suitable "fabric," discussed below. By way of non-limiting example, processor 725 may be an ARM Cortex-M1 CPU, which is available from Mentor Graphics Corp. of Wilsonville, Oreg., U.S.A. The ARM Cortex-M1 CPU may be programmed into any FPGA. By way of non-limiting example, cryptographic co-processor 730 may be an Advanced Encryption Standard ("AES") Rijndael Galois Counter Mode ("GCM") co-processor. That is, cryptographic co-processor 730 may be configured to encrypt, decrypt and authenticate data using AES-GCM algorithms.

Module 700 can store essentially two different forms of data, which are referred to herein as "fabric" and "executables," respectively. Note that the difference between these types of data are essentially how the data are used, rather than how the data are stored. Both fabric and executables are referred to herein collectively as "programming." Fabric may perform functions that are typically associated with hardware. An example of such fabric is the ARM Cortex-M1 CPU, discussed above. Examples of executables are presented below in reference to FIG. 8. In general, fabric may be programmed into FPGA 710, and executables may be stored in NAND flash memory 735. Note that executables may be transferred to one or both of RAM 745 and RAM 720 for execution. In some embodiments, executables are stored in encrypted form in NAND flash memory 735, then transferred to RAM 720, where they are executed by fabric such as a Cortex-M1 CPU present in FPGA 710.

Programming FPGA 710 may be protected in at least two ways. First, as discussed in detail herein, programming may be encrypted using an encryption algorithm and a key. Without the key, programming is essentially useless. This form of protection may be used for both fabric and executables, and each may be separately encrypted using the same or different keys. In some embodiments, the key is stored in distributed form in FPGA 710. Second, programming may be protected by a native programming protection apparatus. This protection works by preventing any FPGA programming unless a cryptographic key known as a "lock key" is first input. ACTEL's ProASIC3L series of integrated circuits utilize such a lock key protection mechanism, known as "FLASHLOCK." The lock key may protect both FPGA 710 and FROM 715 from being altered or read without first providing the key. In some embodiments, the lock key is stored in distributed form in FPGA 710. The second form of protection is also suitable for both fabric and executables.

FPGA 710 and FROM 715 have the ability to permanently store data; that is, data stored on FPGA 710 and FROM 715 may be made permanent. To that end, and by way of non-limiting example, antifuse technology may be used, such as ACTEL's FuseLock technology available on ACTEL's ProASIC3L series of integrated circuits. Once such antifuses are blown, in such embodiments, the contents of FPGA 710 and FROM 715 cannot be modified.

Module 700 includes further portions 735-760, which may reside on integrated circuit 705, or on a different integrated circuit or circuits as depicted in FIG. 7. Module 700 includes a NAND flash memory 735. In certain embodiments, other types of persistent memory may be used, such as by way of non-limiting example, NOR flash memory or Electrically Erasable Programmable Read Only Memory ("EEPROM"). NAND flash memory 735 is controlled via NAND flash memory interface 790. NAND flash memory interface 790 may reside on integrated circuit 705 or on a different integrated circuit or circuits. NAND flash memory interface 790 may be programmed into FPGA 710. As described in detail below, NAND flash memory 735 may be segmented into at least two logical portions, each of which configured to store encrypted or plaintext (i.e., unencrypted) data. That is, NAND flash memory 735 may be logically partitioned into two separate nonvolatile memories, one of which is intended to store information that is meant to remain internal to the module, and the other of which is intended to store information that may be accessible outside the module. Module 700 further includes a processor 740 and RAM 745. Module 700 further includes random number generation block 750. Random number generator block 750 may include a true random number generator, which may use a probabilistic physical phenomenon such as thermal noise, radio frequency noise, video noise, etc. to generate random numbers. Random number generator block 750 may include, in addition or in the alternative, a pseudorandom number generator, such as a linear feedback shift register circuit or a deterministic random bit generator. Voltage regulator 755 serves to protect internal circuitry and regulate voltage where needed. Module 700 is configured to communicate with other electronic devices using interface 760, which may be, by way of non-limiting example, a SD interface or a universal asynchronous receiver-transmitter ("UART") interface, and via physical connector 765, which may be, by way of non-limiting example, a connector that conforms to the microSD standard. Interface 760 may be programmed into FPGA 710.

Module 700 also includes a JTAG interface 770, which is coupled to JTAG physical connectors 775 and to JTAG debug module 780. JTAG interface may reside on integrated circuit 705, in FPGA 710, or on a different integrated circuit or circuits. Note that JTAG interface 770 and JTAG physical connectors 775 may conform to Institute of Electrical and Electronics Engineers ("IEEE") Standard 1149.1. In some embodiments, JTAG physical connectors 775 are located on the face of a micro SD card. In such embodiments, JTAG physical connectors 775 may be covered by an adhesive label once FPGA 710 is finally programmed. In some embodiments, the FPGA 710 is programmable only via JTAG physical connectors 775.

In some embodiments, JTAG interface 770 is coupled to AES cryptographic co-processor 785, which may be distinct from cryptographic co-processor 730. In such embodiments, all programming that is to be stored in FPGA 710 (by way of non-limiting example, fabrics) must be encrypted external to module 700 prior to installation in module 700. In particular, the encrypted programming is wrapped into a file with a header that includes an associated encryption authentication tag. In such embodiments, the associated encryption key is installed in module 700 prior to installing the programming. During installation, the programming is passed through JTAG interface 770, decrypted by cryptographic co-processor 785, and its decryption authentication tag is internally compared to the encryption authentication tag stored in the encrypted programming file header. If the match fails, the programming is not installed.

In some embodiments, each feature 705-750, 760, 770 and 780 is connected only to FPGA 710. In such embodiments, any signal received at connector 765 is routed through interface 760 to FPGA 710. Thus, for example, in such embodiments, programming present in FPGA 710 acts as a gatekeeper between physical connector 765 and NAND flash memory 735. In other embodiments, each feature 705-780 may be operatively coupled to any other feature 705-780. In certain embodiments, the module lacks an internal power supply.

Note that FROM 715 may be protected by several security features. In some embodiments, FROM 715 is writable only through JTAG connectors 775. In such embodiments, FROM 715 may not be written to via physical connectors 765. Further, in such embodiments, FPGA 710 cannot write to FROM 715. Thus, in some embodiments, the only way to alter the contents of FROM 715 is via JTAG connectors 775, prior to the data stored on FROM 715 being made permanent.

In some embodiments, at least a portion of FROM 715 is only internally readable. That is, in such embodiments, at least some of the contents of FROM 715 may not be read via physical connectors 765. In such embodiments, at least some of the contents of FROM 715 may only be read via JTAG physical connectors 775 prior to the contents of FROM 715 being made permanent. Thus, once the contents of FROM 715 are made permanent, such contents cannot be read via physical connectors 765 or JTAG physical connector 775. Furthermore, in some embodiments, only programming executing in processor 725 can access the entire contents of FROM 715. In such embodiments, therefore, the contents of FROM 715 are only accessible to internal logic of module 700 and cannot be accessed externally. In other embodiments, programming executing in processor 740 may have access to the entire contents of FROM 715. In some embodiments, a portion of FROM 715 remains readable via physical connectors 765 even after the contents of FROM 715 are made permanent. For example, as discussed below, FROM 715 may store an ID for module 700. In such embodiments, the module ID may be read out of FROM 715 via physical connectors 765 even after the contents of FROM 715 are made permanent. In such embodiments, the remaining contents of FROM 715 (e.g., other than the module ID) may not be readable via physical connectors 765.

In some embodiments, module 700 is configured to be tamper resistant. For example, module 700 may be fabricated using chemical-resistant potting material, which cannot be etched away from the internal circuitry. The contents of module 700 may be shielded by one or more (e.g., seven) metallic layers. Such layers greatly increase the difficulty of milling away the module's potting material. Some or all of integrated circuits in module 700 (e.g., integrated circuit 705, FPGA 710, RAM 720, NAND flash memory 735, processor 740, RAM 745, random number generator block 750, voltage regulator 755, interface 760, JTAG interface 770, JTAG debug module 780, and cryptographic co-processor 785) may be milled to reduce their thickness. By way of non-limiting example, such elements may be milled to a thickness of less than: 700 micrometers ("μm"), 75 μm, 50 μm, 25 μm or 10 μm. Note that the actual operational portion of a typical integrated circuit is only about ten angstroms ("Å") thick. Accordingly, in some embodiments, some or all of the aforementioned integrated circuits may be milled to a thickness of less than, by way of non-limiting example, 100 Å, 50 Å, 25 Å or 10 Å. Thin integrated circuits are tamper resistant due to their increase fragileness. For example, attempts to tamper with module 700 may result in damaging one or more integrated circuits contained therein.

FIG. 8 is a flowchart depicting initial module provisioning according to an embodiment of the present invention. At block 805, a test programming programmer provisions the module with certain data. For example, the test programming programmer stores a lock key and a test programming fabric key in module 700, by way of non-limiting example, in FPGA 710 in distributed form. Once the lock key is installed, FPGA 710 may only be reprogrammed by someone with knowledge of the lock key. The test programming programmer programs FPGA 710 with test programming fabric, which is externally encrypted with the test programming fabric key. More particularly, the test programming programmer creates a file containing a copy of the test programming fabric encrypted using the test programming fabric key. The file also contains a header, which includes a copy of the associated encryption authentication tag. The test programming programmer then installs the file in module 700, which utilizes cryptographic co-processor 785 and the stored test programming fabric key to decrypt the test programming fabric and generate a decryption authentication tag. That tag is compared with the encryption authentication tag contained in the header, and if the two tags do not match, the programming halts. Otherwise, the decrypted test programming fabric is stored in FPGA 710.

In addition, the test programming programmer stores an encrypted test programming executable in NAND flash memory 735 and the associated test programming executable encryption key in module 700 (e.g., in FPGA 710, FROM 715 or NAND flash memory 735). Note that without access to the test programming executable key, it is not possible to read or modify the test programming executable in any useful way. Because module 700 includes cryptographic co-processor 740 and the test programming key, it is able to internally decrypt the test programming executable and transfer it to RAM 745 or RAM 720 for execution by the test programming fabric stored in FPGA 710. In some embodiments, the test programming executable is not encrypted. In such embodiments, the associated test programming executable key is omitted.

In some embodiments, the test programming fabric includes the following, each of which is implemented in FPGA 710. The test programming fabric may include an ARM Cortex-M1 CPU (e.g., as, instead of, or in addition to, processor 725), a JTAG debug module (e.g., JTAG debug module 780), an interface connecting to NAND flash memory 735, an interface connecting to RAM 745 and a general purpose interface to physical connector 765 (e.g., as, or in addition to, interface 760).

The test programming programmer generally uses external equipment to program and, together with the test programming, to test the modules it manufacturers. In some embodiments, the manufacturer utilizes a JTAG fixture, such as a FlashPro3 device, available from ACTEL of Mountain View, Calif., U.S.A. The test programming programmer may also employ loopback provisions for testing the modules. That is, the test programming programmer may feed signals generated by a module back to the module in order to detect problems with, e.g., physical connectors 765.

The test programming programmer uses the test programming fabric and executable to run diagnostic processes on the module in order to ensure that is has been correctly manufactured without flaws or tampering. Testing may occur via one or both of physical connector 765 and JTAG physical connector 775. One such test includes testing RAM 745, including a data bus test for shorts and opens, an address uniqueness test, and a test of high and low states of every bit. The RAM 745 test may be somewhat limited by the test programming's usage of RAM 745. Yet another test includes testing the interface to NAND flash memory 735 and verifying that fundamental operations (e.g., reading module ID registers) are working correctly. Yet another test includes counting the number of blocks in NAND flash memory 735 that are bad, verifying that block zero is functional, and verifying that the total number of bad blocks is not excessive. Yet another test verifies that the physical connections from FPGA 710 to physical connector 765 are sound by utilizing loopback provisions in the manufacturer's test fixture. If the module passes each test, the test programming programmer sends it to the provisioning entity. In some embodiments, the test programming programmer sends all manufactured modules, whether the test results are successful or not, to the key generation programming programmer or the base provisioning entity.

The test programming programmer then sends at least the operational modules to a key generation programming programmer. The test programming programmer may erase the test programming and associated keys, or may send the modules on as-is. The test programming programmer may re-run one or more tests available from the test programming once it receives the modules.

At block 810, the key generation programming programmer stores key generation programming in module 700. The key generation programming is intended to be used once in order to generate two keys, as discussed in detail below. In some embodiments, the key generation programming programmer stores key generation programming fabric in FPGA 710 in essentially the same way that the test programming programmer stored the test programming fabric in FPGA 710. That is, the key generation programming programmer may first store a key generation programming fabric key in module 700, e.g., in FPGA 715 in distributed form, inserts encrypted key generation programming fabric into FPGA 715, and a comparison between associated authentication tags is performed. In some embodiments, the key generation programming fabric key replaces the test programming fabric key, and the key generation programming fabric overwrites the test programming fabric. Alternately, in some embodiments, the key generation programming fabric is identical to the test programming fabric that is already present in FPGA 710 at this stage. The key generation programming programmer also stores an encrypted key generation programming executable in NAND flash memory 735 and the associated key generation programming executable key in module 700 (e.g., in FPGA 710, FROM 715 or NAND flash memory 735).

Note that the key generation programming programmer may need to supply the lock key in order to be able to program FPGA 710. If the supplied lock key fails to unlock FPGA 710 for programming, the module may immediately join the other modules (if any) that failed any previous test. Alternately, the module may be tested to determine if the module hardware is flawed or if its programming or keys have been tampered with. For example, the module may be re-programmed with the test programming. If the test programming operates normally after this re-programming, then it is likely that the initially-installed test programming had been tampered with or corrupted. The module may then join the other modules (if any) that failed any previous test.

At block 815, the key generation programming programmer stores a unique module identification ("ID") and random number seed in FROM 715. By way of non-limiting example, the random number seed may be 256 bits long and contain 256 bits of entropy, and the module ID may be sixteen bytes long. The module ID may include a hardware serial number and a manufacturing date.

At block 815, the key generation programming executes to generate a bootstrap key and a memory protection key. These keys may be, by way of non-limiting example, 256-bit GCM-AES keys. The generation of these keys may involve using the random number seed stored in FROM 715 as a seed value for a pseudorandom number generator that forms part of random number generator block 750. The pseudorandom number generator may generate pseudorandom numbers that may be used as keys or passed through a hashing algorithm to generate the two keys. Alternately, or in addition, random number generator block 750 may itself generate true random numbers that may be used as the two keys or passed through a hash algorithm to generate the two keys. Alternately, generated random numbers may be combined with one or more input random numbers using a mixing function, such as XOR. An alternate mixing function that may be used is the GCM-AES encryption algorithm, which may accept random or pseudorandom numbers as any, or a combination, of the encryption key for the algorithm, the plain text to be encrypted, and the nonce (i.e., the initialization vector). The resulting data generated by the encryption algorithm may then be used as the final key or keys.

At block 825, the key generation programming encrypts the memory protection key with the bootstrap key using, by way of non-limiting example, cryptographic co-processor 730. The encryption operation may accept the module ID, the random number stored in FROM 715, and other FROM contents as additional data. Alternately, the encryption operation may accept the random number stored in FROM 715 and other FROM contents as additional data and the module ID as the nonce. Thus, the encryption operation of the GCM-AES algorithms produce an encrypted memory protection key and an encryption authentication tag. The bootstrap key and the encryption authentication tag are stored in unencrypted form in NAND flash memory 735. A portion of NAND flash memory 735 is set aside to store data encrypted using the memory protection key. In this manner, the module is provisioned with a secure portion of NAND flash memory 735 that is used to contain protected data. Note that, in some embodiments, the memory protection key never leaves the module in unencrypted form. In some embodiments, the memory protection key never leaves integrated circuit 705.

At block 830, the encrypted memory protection key is passed outside module 700 through SD interface using a special command that is only available in the key generation programming. Alternately, or in addition, the encrypted memory protection key is passed out of the module via JTAG interface 770. The encrypted memory protection key is then returned to module 700 via JTAG interface 770 and stored in FROM 715. Note that in some embodiments, FPGA 710 cannot write to FROM 715, and the only way to store data in FROM 715 is via JTAG physical connectors 775. In such embodiments, passing the encrypted memory protection key outside of module 700 allows it to be stored in FROM 715. Note that the memory protection key never exists outside of the module in an unencrypted form.

At this stage, the module may be transferred to a general operation programming programmer, which may be a different entity from the key generation programming programmer. Alternately, the general operation programming programmer may be the same entity as the key generation programming programmer.

At block 835, general operation programming fabric is installed in FPGA 710. The installation procedure is essentially the same as the installation procedure for the test programming fabric. Thus, a general operating programming fabric key is stored in module 700 (e.g., in FPGA 715 in distributed form), the general operation programming fabric is encrypted using the key, an encryption authentication tag is generated and a file with a header containing the encryption authentication tag is inserted into module 700, which decrypts the general operation programming fabric and stores it in FPGA 710. In alternate embodiment, the key generation programming fabric is used as the general operation programming fabric, i.e., no new fabric is installed as the general operation programming fabric.

In addition, a general operation programming executable is encrypted using memory protection key and stored in NAND flash memory 735. The authentication tag associated with encrypting the general operation programming executable is also stored in nonvolatile memory (e.g., a portion of NAND flash memory 735 that may be encrypted using the memory protection key).

In addition, a boot programming executable associated with the general operation programming is encrypted using the memory protection key and stored in a boot area of NAND flash memory 735. The encryption authentication tag that results from encrypting the boot programming is stored in nonvolatile memory (e.g., FPGA 710, NAND flash memory 735 or FROM 715).

After validating that the general operation programming is operational, at block 840, the data stored in FPGA 710 is made permanent. This may be accomplished via, by way of non-limiting example, blowing antifuses. ACTEL's Fuse-Lock technology may be used to that end. Note that at this stage, at least a portion of the contents of FROM 715, including the encrypted memory protection key, are only internally accessible to module 700.

The boot programming is responsible for loading the general operation programming executable from NAND flash memory 735 to RAM 745 during normal operation. More particularly, each time the module starts up, the module transfers the bootstrap key from NAND flash memory 735 into FPGA 710. There, the bootstrap key is used to decrypt the memory protection key. The decryption operation produces a decryption authentication tag, which is compared to the encryption authentication tag that is stored in NAND flash memory 735. If the tags do not match, operation is halted and the module disables further operations. If the tags match, the decrypted memory protection key is used to decrypt the contents of the boot area of NAND flash memory 735, i.e., the boot programming. Decrypting the boot programming produces a decryption authentication tag, which is compared with the associated encryption authentication tag that is stored in nonvolatile memory. Again, if the comparison fails, operations are disabled and the start-up process is halted. Otherwise, the module transfers the boot programming executable to RAM 745, where it proceeds to execute. The executing boot programming then causes the general operation programming executable to begin executing. Note that the decrypted memory protection key never leaves module 700 during the process of decrypting the contents of the boot area, or at any other time.

Note that encrypting the memory protection key, which is stored in FROM 715, using the bootstrap key, which is stored in NAND flash memory 735, mitigates against an attack against either of NAND flash memory 735 or FROM 715 alone. An attacker must have both the bootstrap key and the contents of FROM 715 to decrypt the memory protection key, which is required to correctly decrypt the contents of the portion of NAND flash memory 735 whose data is encrypted using the memory protection key.

However, even if an attacker knows the bootstrap key, he or she cannot access the unencrypted memory protection key. More particularly, once the data stored in FPGA 710 and FROM 715 is made permanent, JTAG interface 770 is useless, rendering JTAG physical connector 775 useless as well. Thus, the encrypted memory protection key cannot be read out via JTAG interface 770 and JTAG physical connector 775. Likewise, the encrypted memory protection key cannot be read out via interface 760 and physical connector 765, as the general operation programming provides no commands or other means to access the entire contents of FROM 715 (although the module ID may still be read via physical connectors 765). Thus, to successfully crack the memory protection key, an attacker must somehow gain access to both NAND flash memory 735 (which stores the bootstrap key) and FROM 715 (which stores the encrypted memory protection key).

Note that blocks 810, 815, 830, 835 and 840 may be performed by software external to module 700. Blocks 820 and 825 may be performed by the key generation programming. The external software may automatically invoke the key generation programming at blocks 820 and 825.

Figure 9:
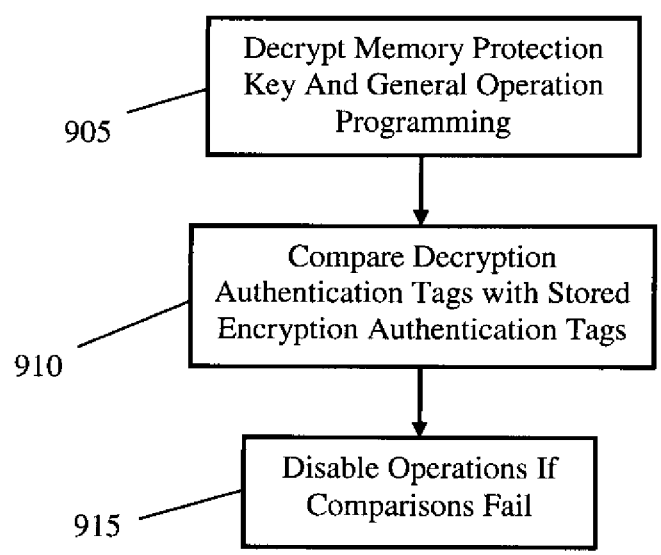
FIG. 9 is a flowchart depicting general operation programming authentication and memory protection key authentication according to an embodiment of the present invention.

FIG. 9 is a flowchart depicting general operation programming authentication and memory protection key authentication according to an embodiment of the present invention. Whenever the module is started (e.g., by applying power), the memory protection key and general operation programming executable are authenticated. This process begins by retrieving the bootstrap key from NAND flash memory 735. At block 905, the memory protection key is decrypted using the bootstrap key. This decryption results in a decryption authentication tag. Thus, at block 910 the decryption authentication tag for the memory protection key is compared with the encryption authentication tag, stored in NAND flash memory 735, for the memory protection key. Likewise, at block 910 the decryption authentication tag for the general operation programming executable is compared with the corresponding encryption authentication tag, which is stored in nonvolatile memory. If either of these comparisons reveal that the encryption tag does not match the decryption tag, at block 915, operations of the module are disabled. In some embodiments, no operations are available if the comparison fails. That is, in some embodiments, a failed comparison at block 915 causes the module to permanently enter "brick mode," that is, provide no operations whatsoever. If the comparisons both result in matches, then the module is available for operations. In particular, the memory protection key may be used to encrypt data written to a portion of NAND flash memory 735.

The installed general operation programming is responsible for initiating and executing the processes described in detail in reference to FIGS. 10-13. Note that some of these processes involve communication with outside entities.

Once the module has authenticated the general operation programming and memory protection key, and once the module is coupled with a device (e.g., a mobile phone), the module may upload to the device software that executes in the device in support of module operations. Such software may be initially stored in the module's nonvolatile memory and may be uploaded to the module along with, by way of non-limiting example, the general operation programming.

Figure 10:
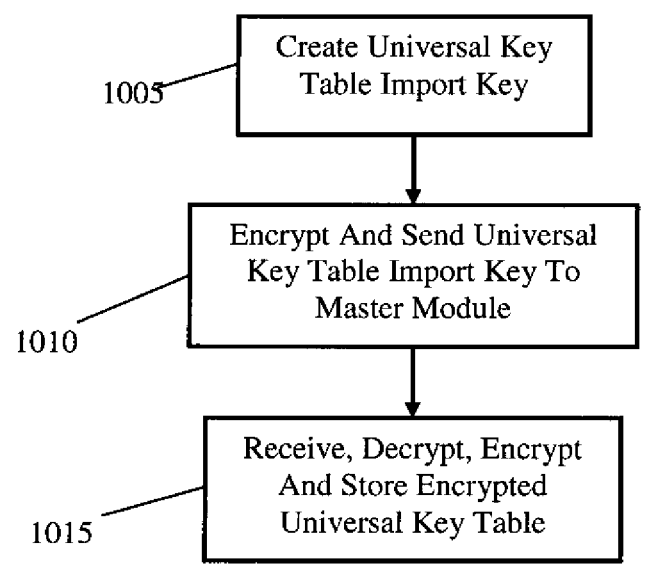
FIG. 10 is a flowchart depicting universal key table provisioning according to an embodiment of the present invention.

FIG. 10 is a flowchart depicting universal key table provisioning according to an embodiment of the present invention. According to some embodiments of the present invention, each module is provisioned with a universal key table, which is identical in each module. Modules may, in general, be provisioned with additional key tables. Note that key tables according to some embodiments of the present invention include a key table identifier and multiple cryptographic keys, each associated with an index. Such indices allow communicating entities to determine whether they are in possession of an identical key by simply communicating the key table's identifier and the key's index, without disclosing the key itself. "Key tables," as that term finds meaning in U.S. Pat. No. 7,325,133 entitled "Mass Subscriber Management" to Fascenda, the disclosure of which is incorporated by reference, may be implemented as the key tables referred to herein in certain embodiments of the present invention. In some embodiments of the present invention, the key tables are accompanied by additional data, such as policy or permission information. As discussed elsewhere herein, each module also contains keys that are unique to that module.

Provisioning a module with the universal key table begins at block 1005, where the module internally generates a universal key table import key. The universal key table import key may be generated using the module's random number generator block 750. In some embodiments, the universal key table import key is a 256-bit GCM-AES key.

At block 1010, the universal key table import key is encrypted using the public key of a master module. A "master module" is a module as described herein as module 700 in FIG. 7 but that additionally contains a private key of an asymmetric key pair. Such a key pair may be generated using random number generator block 750. The public key of such a key pair is made publicly available, while the private key may be encrypted using the memory protection key and stored in NAND flash memory 735 or FROM 715. Block 1010 concludes with the module to-be-provisioned outputting its encrypted universal key table import key.

The output encrypted universal key table import key is received by the master module, which decrypts it using its private key. The master module stores a universal key table using a table protection key, which it also stores, e.g., in the master module's NAND flash memory, encrypted using the master module's memory protection key. The master module encrypts the table protection key using the universal key table import key of the module to be provisioned. If the universal key table has associated permission or policy information, that information may be separately encrypted or encrypted using the same table protection key. The master module then sends the encrypted table protection key and the encrypted universal key table to the module to be provisioned. In some embodiments, the decrypted universal key table import key never exists outside any module, including the master module, in unencrypted form.

In some embodiments, the master module delivers the same universal key table, encrypted using the same table protection key, to every requesting module. In other embodiments, the master module periodically (e.g., daily, weekly or monthly) generates a new table protection key, encrypts the universal key table using the new key, and replaces the previously encrypted universal key table with the newly encrypted universal key table in storage. Over the course of the period, the master module delivers the universal key table encrypted using the same table protection key for that period.

In some embodiments, the master module stores the encrypted universal key table externally, e.g., in a hard drive. In some embodiments, the master module stores all of its key tables externally, e.g., in a hard drive, in encrypted form.

At block 1015, the module receives the encrypted universal key table, which is encrypted with the table protection key. The module decrypts the table protection key using its universal key table import key, decrypts the universal key table using the decrypted table protection key, encrypts the universal key table using the memory protection key of the module, and stores the universal key table in the portion of the module's NAND flash memory that is encrypted using the memory protection key of that module. Note that the operations referred to in the previous sentence occur entirely inside of the module.

At this point, the module has access to every key in the universal key table. Accordingly, the module can enable secure communications between a device to which it is operably coupled and any other device that is operably coupled to a module that also contains a copy of the universal key table. In particular, communications between such devices may be encrypted using a shared key that is present in the universal key table. In some embodiments, shared keys form the universal key table are used to exchange random numbers, which are then used to generate keys used to encrypt communications. The keys present in the universal key table may be used to secure communications or authenticate communicating entities as described in U.S. Pat. No. 7,325,134 entitled "Localized Network Authentication And Security Using Tamper-Resistant Keys" to Fascenda, the disclosure of which is incorporated herein.

Figure 11:
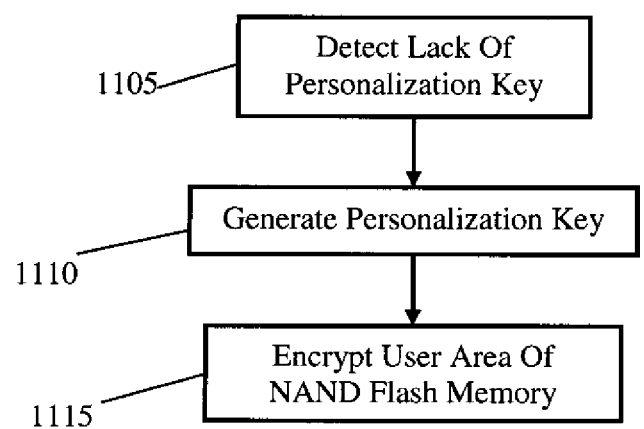
FIG. 11 is a flowchart depicting personalization key provisioning according to an embodiment of the present invention.

FIG. 11 is a flowchart depicting personalization key provisioning according to an embodiment of the present invention. A module's personalization key is, by way of non-limiting example, a GCM-AES key that is used to encrypt a portion of the module's NAND flash memory 735. Thus, after establishing a personalization key as described in reference to FIG. 11, the module's NAND flash memory 735 will include at least two encrypted logically partitioned portions: a portion encrypted using the memory protection key and a portion encrypted using the personalization key, described further below. At block 1105, upon initial startup of the module, the general operation programming detects whether a personalization key is present in the portion of NAND flash memory 735 that is encrypted using the memory protection key. If not, at block 1110, the module proceeds to generate a personalization key using random number generation block 750.

At block 1115, the general operation programming encrypts the contents of the user area of NAND flash memory 735 using the personalization key. Note that the "user area" of NAND flash memory 735 may be accessible when the module is installed into a standard card reader, such as a SD card reader. In general, the user area appears as an external mass storage module (e.g., an "E: Drive"). Thus, encrypting the user area of the module's NAND flash memory 735 protects that area from naïve attacks using standard reader hardware and software. Even if an attacker were to obtain the personalization key by attacking the area of NAND flash memory 735 that contains it in encrypted form, the attacker would still know nothing about the data that is stored in the area of NAND flash memory 735 that is protected by the memory protection key.

Note that, in some embodiments, access via a standard card reader to the user area of NAND flash memory 735 is prevented unless a personal identification number ("PIN") or password is provided. In such embodiments, the PIN or password typically acts to prevent access to the user area, while the personalization key is used to encrypt its contents. In some embodiments, the PIN conforms to the micro SD standard.

Figure 12:
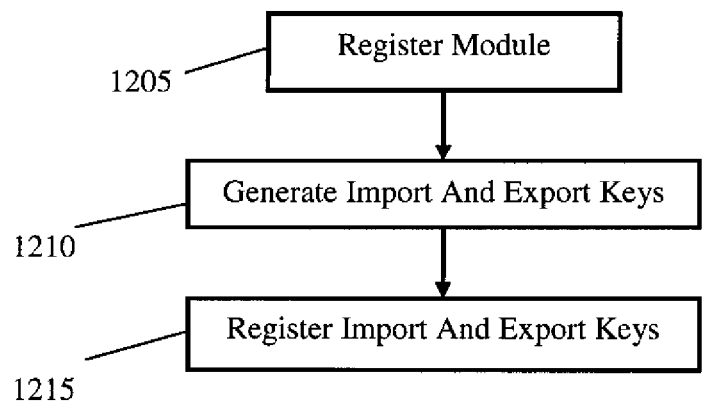
FIG. 12 is a flowchart depicting import key and export key provisioning according to an embodiment of the present invention.

FIG. 12 is a flowchart depicting import key and export key provisioning according to an embodiment of the present invention. The process described in reference to FIG. 12 may occur after the bootstrap key, the memory protection key and the personalization key have been derived and stored. In general, the process of FIG. 12 may occur once the module is in possession of an end user and registered.

Thus, at block 1205, the end user registers the module. This may be controlled by software stored in the device to which provisioned modules according to embodiments of the present invention are coupled, e.g., mobile telephones. The end user may be the owner of the module, in which case, the end user may input his or her identification in response to an owner-identification query issued by software installed in the mobile telephone. By way of non-limiting example, the first time an end user connects a module according to an embodiment of the present invention to a mobile telephone, software installed in the mobile telephone securely connects to a master module or a management entity. Such a management entity may be in communication with a master module or have access to a repository of key tables and other information encrypted using parameters of a master module. An exemplary management entity may have a web portal to which the mobile telephone's software connects. The mobile telephone communicates the associated module ID to the master module or management entity, which stores the module ID and other communicated information. If the end user has input owner identification, then such identification is also communicational to the master module or management entity, which stores it in association with the module ID. Otherwise, the master module or management entity may associate the module ID with the management entity as owner.

At block 1210, the general operation programming generates two keys: an import key and an export key. By way of non-limiting example, the import key and the export key may each be 256-bit GCM-AES symmetric keys. These keys are encrypted using the memory protection key and stored in the area of NAND flash memory 735 that is protected by that key. At block 1215, the two keys are securely sent to a master module, by way of non-limiting example, under encryption using the master module's public key of an asymmetric key pair. The master module stores the import and export keys in its NAND flash memory (or elsewhere, such as an external hard disk drive), encrypted with its own memory protection key. The import key may be subsequently used to encrypt key tables, keys that encrypt key tables, and other information during transfer to the module that generated it. The export key is used to allow the module that generated it to securely transfer data stored in, e.g., the user area of NAND flash memory 735. Any entity that has access to a module, or other repository, that contains the sending module's export key (and that can decrypt it) can decrypt such transferred data. Note that the import and export keys never exist outside any module in unencrypted form.

The user may securely transfer data outside of the user's module to another similarly-provisioned module, a master module, or any storage repository that may or may not be connected to a module. To do so, the module may proceed as follows. First, if necessary, the module decrypts the data to be transferred using, e.g., the user's personalization key. That data is re-encrypted using any shared key, e.g., the module's export key or a shared key. The data is then sent to its destination, along with the sending module's ID and, if necessary, a key table identifier and key index. Any entity that has access to the key that was used to encrypt the data (e.g., the sending module's export key or a shared key) can decrypt the sent data. For example, if data encrypted using the sending module's export key was sent to a storage repository via a web portal, a computer or other device in communication with a master module that has archived the sending module's export key may retrieve the data over the web portal and decrypt it using the export key of the sending module. Thus, data may be securely sent between communication entities in real time or non-real time, e.g., by having the sender send encrypted data to a repository, which the receiver later accesses to retrieve and decrypt the data.

Figure 13:
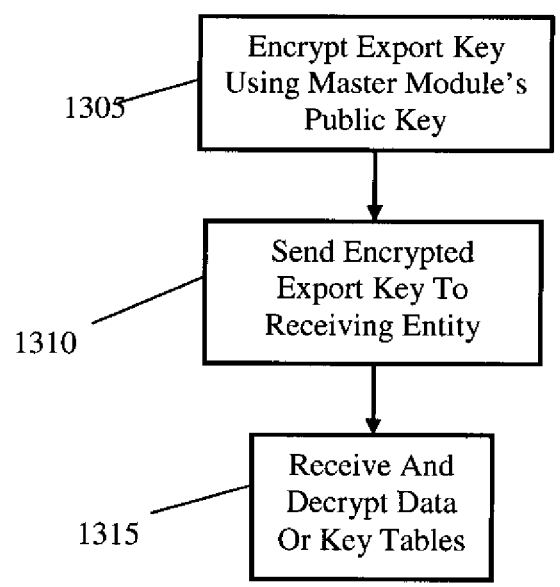
FIG. 13 is a flowchart depicting provisioning a module with additional key tables or data according to an embodiment of the present invention.

FIG. 13 is a flowchart depicting provisioning a module with additional key tables or data according to an embodiment of the present invention. In general, the module may receive the additional key tables or data from a master module or repository. As discussed above in reference to FIG. 12, the master module securely holds a private key of an asymmetric key pair and makes the associated public key publicly available. At block 1305, the receiving module decrypts its import key using its memory protection key and then encrypts the import key using the master module's public key. The receiving module sends its encrypted import key to the master module at block 1310. The master module uses its private key, which it internally decrypts using its memory protection key, to decrypt the received import key. Note that blocks 1305 and 1310 may have been previously performed if the master module is one that the receiving module has previously registered with, e.g., using the techniques described in reference to FIG. 12.

The master module or repository then retrieves one or more key tables that were previously encrypted using a table protection key, or other data. The table protection key or data is encrypted using the receiving module's import key and sent to the receiving module. At block 715, the receiving module receives the encrypted key table(s) or data, internally decrypts the data or table protection key using its import key, and then uses the import key to internally decrypt the key tables(s). Finally, the receiving module internally encrypts the additional key table(s) or data using its memory protection key, and stores the encrypted key table(s) or data in the portion of its NAND flash memory that is protected by its memory protection key. Alternately, the receiving module internally encrypts the additional key table(s) or data using its personalization key, and stores the encrypted key table(s) or data in the portion of its NAND flash memory that is protected by its personalization key.

Note that the same procedure of the above paragraph may be used to securely sign data sent between two entities that have access to the appropriate modules. The protocol is changed only by appending signatures to data as opposed to encrypting data, and verifying such signatures instead of decrypting such data.

Note that the master module may internally generate key tables using the master module's random number generator block, encrypt them using the master module's memory protection key, and then store them in the master module's NAND flash memory. Consequently, in this embodiment, the additional key tables never exist in unencrypted form outside of any module. However, encrypted key tables may be transferred between modules or stored in modules or elsewhere.

Certain disclosure herein refers to modules sending or receiving executables, fabrics, keys or other data. In some embodiments, such communications may be performed in concert with hardware to which such modules are operatively coupled. By way of non-limiting example, such hardware includes mobile telephones, personal digital assistants and networked computers. The communications may be sent and received over communications channels such as, by way of non-limiting example, cellular telephone networks, the Internet, local area networks ("LAN") and wide area networks ("WAN").

In some embodiments, executables, fabrics, keys or other data may be stored on one or more computer readable media, such as, by way of non-limiting example, flash memory, magnetic disk or optical disk. Such executables, fabrics, keys or other data may be transferred between entities by transferring the computer readable media on which they are stored.

In some embodiments, any number of different entities may perform any of the provisioning steps described herein.

In some embodiments, the modules are returned to the base provisioning entity to have one or more of the following keys installed at the appropriate stage: test programming fabric key, test programming executable key, key generation programming fabric key, key generation programming executable key and general operation programming fabric key. The base provisioning entity may then deliver the modules to the appropriate programming entity for that stage, together with the properly encrypted programming. Note that in such embodiments, the programmer does not have access to the programming in unencrypted form, and cannot retrieve from the module the key(s) necessary to decrypt the encrypted programming it receives from the base provisioning entity.

In alternate embodiments, one or more of the following keys may be supplied separately from its associated programming: test programming fabric key, test programming executable key, key generation programming fabric key, key generation programming executable key, general operation programming fabric key and memory protection key. Such separate delivery may occur via separate electronic messages (e.g., email or file transfer protocol), separate physical deliveries (e.g., via mail carrier), or a combination. For example, the test programming fabric key may be stored on a magnetic disk and sent by courier to the test programming programmer or another entity that inserts the key into the module, and the encrypted test programming fabric may be made available at a web portal in file transfer protocol format for the test programming programmer to download.

Unless otherwise stated, any of the cryptographic keys referred to herein may be symmetric or asymmetric. By way of non-limiting example, any of the cryptographic keys referred to herein may have the following number of bits: 128, 256, 512, 1024 and 2048. Any of the cryptographic keys referred to herein may be used for, by way of non-limiting example, cryptographic operations using a GCM-AES algorithm.

Some embodiments of the present invention replace FPGA 710 with an application specific integrated circuits ("ASIC"). In such embodiments, a single physical connector may be used to insert programming and to interface with the module for cryptographic operations.

Types of nonvolatile memory that are suitable for use in embodiments of the present invention include, by way of non-limiting example, ROM, NOR memory, PROM, EPROM and EEPROM. For example, any type of nonvolatile memory may be used in addition to, or instead of NAND flash memory 735.

It will be readily understood by those persons skilled in the art that embodiments of the present inventions are susceptible to broad utility and application. Many embodiments and adaptations of the present inventions other than those herein described, as well as many variations, modifications and equivalent arrangements, will be apparent from or reasonably suggested by the present invention and foregoing description thereof, without departing from the substance or scope of the invention.

At this point it should be noted that remote secure backup in accordance with the present disclosure as described above typically involves the processing of input data and the generation of output data to some extent. This input data processing and output data generation may be implemented in hardware or software. For example, specific electronic components may be employed in a computer or similar or related circuitry for implementing the functions associated with remote secure backup in accordance with the present disclosure as described above. Alternatively, one or more processors operating in accordance with instructions may implement the functions associated with remote secure backup in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of securely registering a module for backup, wherein the module comprises a processor, the method comprising:
generating an export cryptographic key using the module, wherein the module comprises a first nonvolatile memory and a second nonvolatile memory, and further wherein the first nonvolatile memory and the second nonvolatile memory are logically partitioned portions of a single physical persistent memory;
automatically generating, using the processor, a backup cryptographic key for the module that is unique to the module, wherein the backup key is employed to encrypt user data associated with the module for transmission of the user data to a backup center;
generating a hash of the backup key;
encrypting, using the processor, the backup cryptographic key using the export cryptographic key;
transmitting the encrypted backup cryptographic key, the generated hash of the backup key, and a module identifier corresponding to the module, to a backup center; and
storing the encrypted backup cryptographic key, the transmitted hash of the backup key, and the transmitted module identifier, with the backup center.

2. The method of claim 1, wherein the module lacks a power supply.

3. The method of claim 1, wherein a form factor of the module may be one or more of the following: a Secure Digital Card ("SD"), mini SD, micro SD, PCMCIA, P2, Compact Flash, Memory Stick, PRO Memory Stick, PRO Duo Memory Stick, Micro Memory Stick, Multi Media Card, SmartMedia Memory Card, MultiMedia Memory Card, Reduced Size MultiMedia Memory Card, MultiMedia Memory Card Mobile, MultiMedia Memory Card Plus, MultiMedia Memory Card Micro, xD Memory Card, SIP, DIP and Universal Serial Bus ("USB").

4. A method of securely backing up a module with cryptographic parameters, wherein the module comprises a processor, the method comprising:
determining, using the processor, whether a plurality of user blocks or sectors of data of the module have changed, wherein the module comprises a first nonvolatile memory and a second nonvolatile memory, and further wherein the first nonvolatile memory and the second nonvolatile memory are logically partitioned portions of a single physical persistent memory;
encrypting each user block of the plurality of changed user blocks or sectors of data using at least one of a plurality of backup cryptographic keys, wherein each of the plurality of backup cryptographic keys are generated to correspond to each user block of the plurality of changed user blocks or sectors of data, and further wherein the plurality of backup cryptographic keys are encrypted by the module using an export cryptographic key generated by the module;
transmitting the encrypted changed user blocks or sectors of data to a backup center; and
storing the changed user blocks or sectors of data in storage associated with the backup center.

5. The method of claim 4, further including:
transmitting the backup cryptographic key to the backup center with the encrypted changed user blocks or sectors of data.

6. The method of claim 4, wherein the module lacks a power supply.

7. The method of claim 4, wherein a form factor of the module may be one or more of the following: a Secure Digital Card ("SD"), mini SD, micro SD, PCMCIA, P2, Compact Flash, Memory Stick, PRO Memory Stick, PRO Duo Memory Stick, Micro Memory Stick, Multi Media Card, SmartMedia Memory Card, MultiMedia Memory Card, Reduced Size MultiMedia Memory Card, MultiMedia Memory Card Mobile, MultiMedia Memory Card Plus, MultiMedia Memory Card Micro, xD Memory Card, SIP, DIP and Universal Serial Bus ("USB").

8. A method of securely restoring a new module with cryptographic parameters, wherein the new module comprises nonvolatile memory and a processor, the method comprising:
registering the new module;
reading an original backup cryptographic key into a master module, the original backup cryptographic key generated by an original module;
decrypting the original cryptographic backup key;
reading a new backup cryptographic key into the master module, the new backup cryptographic key associated with the new module, wherein the new backup cryptographic key is generated by the new module, unique to the new module, and encrypted by the new module using an export cryptographic key generated by the new module;
reading encrypted original user data from backup storage, wherein the original user data is from the original module;
decrypting the original user data using the original backup cryptographic key;
encrypting the decrypted original user data using the new backup cryptographic key;
transmitting the user data encrypted using the new backup cryptographic key to the new module and the backup storage; and
destroying the original user data and the original backup cryptographic key.

9. The method of claim 8, wherein the decrypting the original backup cryptographic key includes:
decrypting the original backup cryptographic key within the master module.

10. The method of claim 8, wherein the module lacks a power supply.

11. The method of claim 8, wherein a form factor of the module may be one or more of the following: a Secure Digital Card ("SD"), mini SD, micro SD, PCMCIA, P2, Compact Flash, Memory Stick, PRO Memory Stick, PRO Duo Memory Stick, Micro Memory Stick, Multi Media Card, SmartMedia Memory Card, MultiMedia Memory Card, Reduced Size MultiMedia Memory Card, MultiMedia Memory Card Mobile, MultiMedia Memory Card Plus, MultiMedia Memory Card Micro, xD Memory Card, SIP, DIP and Universal Serial Bus ("USB").

12. A system comprising:
a module comprising a processor, wherein the master module is operable to generate an export cryptographic key, generate a backup cryptographic key that is unique to the master module, wherein the backup key is employed to encrypt user data associated with the module for transmission of the user data to a backup center, encrypt the backup cryptographic key using the export cryptographic key, generate a hash of the backup key, and transmit the encrypted backup cryptographic key, the generated hash of the backup key, and a module identifier corresponding to the module, to a backup center;

the backup center, in communication with the module, the backup center comprising off-site storage and a backup key database, wherein the backup center is operable to store encrypted data from the module and recall data to the module or to a second module, and wherein the backup key database comprises at least one backup cryptographic key that has been encrypted according to the export cryptographic key; and wherein the module comprises a first nonvolatile memory and a second nonvolatile memory, and further wherein the first nonvolatile memory and the second nonvolatile memory are logically partitioned portions of a single physical persistent memory.

13. The system of claim 12, wherein the is further operable to:

encrypt data changed after a historical time; and transmit the encrypted changed data to the backup center.

14. The system of claim 13, wherein the historical time is a time the module last transmitted encrypted changed data to the backup center.

15. The method of claim 8, wherein the decrypting the original user data includes:

decrypting, within the master module, the original user data using the original backup cryptographic key.

16. The method of claim 8, wherein the encrypting the decrypted original user data includes:

encrypting, within the master module, the decrypted original user data using the new cryptographic backup key.

* * * * *